(12) United States Patent
Weigl

(10) Patent No.: US 11,331,746 B2
(45) Date of Patent: May 17, 2022

(54) DEVICE AND METHOD FOR CHANGING THE WELDING DIRECTION OF THE WELDING SHOULDER OF A SYSTEM FOR A FRICTION STIR WELDING PROCESS VIRTUALLY WITHOUT DELAY

(71) Applicant: GRENZEBACH MASCHINENBAU GMBH, Asbach-Bäumenheim (DE)

(72) Inventor: Markus Weigl, Donauwoerth (DE)

(73) Assignee: GRENZEBACH MASCHINEBAU GMBH, Asbach-Bäumenheim (DE)

( * ) Notice: Subject to any disclaimer, the term of this patent is extended or adjusted under 35 U.S.C. 154(b) by 101 days.

(21) Appl. No.: 16/764,481

(22) PCT Filed: Nov. 14, 2018

(86) PCT No.: PCT/DE2018/000334
§ 371 (c)(1),
(2) Date: May 15, 2020

(87) PCT Pub. No.: WO2019/101253
PCT Pub. Date: May 31, 2019

(65) Prior Publication Data
US 2020/0353559 A1 Nov. 12, 2020

(30) Foreign Application Priority Data
Nov. 27, 2017 (DE) .................... 10 2017 010 965.6

(51) Int. Cl.
*B23K 20/00* (2006.01)
*B23K 20/12* (2006.01)
*B23K 103/08* (2006.01)

(52) U.S. Cl.
CPC ........ *B23K 20/1255* (2013.01); *B23K 20/123* (2013.01); *B23K 20/126* (2013.01); *B23K 20/129* (2013.01); *B23K 2103/08* (2018.08)

(58) Field of Classification Search
CPC .............. B23K 20/1245; B23K 20/126; B23K 20/1255; B23K 20/123; B23K 20/125;
(Continued)

(56) References Cited

U.S. PATENT DOCUMENTS 6,299,050 B1 * 10/2001 Okamura ............. B23K 20/123
156/73.5
7,156,277 B2 1/2007 Ishikawa et al.
(Continued)

FOREIGN PATENT DOCUMENTS

CN 203843367 9/2014
CN 204771125 11/2015
(Continued)

*Primary Examiner* — Erin B Saad
(74) *Attorney, Agent, or Firm* — Duane Morris LLP; Gregory M. Lefkowitz

(57) ABSTRACT

The invention relates to a device and a method for changing the welding direction of the welding shoulder of a system for a friction stir welding process virtually without delay when required by the geometric arrangement of the joint partners to be welded or by a material unevenness, having the following method features: a) a main part (1) with a horizontally movable bridge support (5) has a friction welding head (12) which can be vertically adjusted together therewith and which has a pin receiving area (13) for mounting and driving a welding pin tip (14), wherein the welding shoulder (18) has a welding shoulder receiving area (17) which is supported at multiple points, and b) the welding shoulder receiving area (17) can be adjusted to any angle of attack relative to the joint partners by means of different push-pull rods (16) during the welding process.

8 Claims, 5 Drawing Sheets

Figure 1:
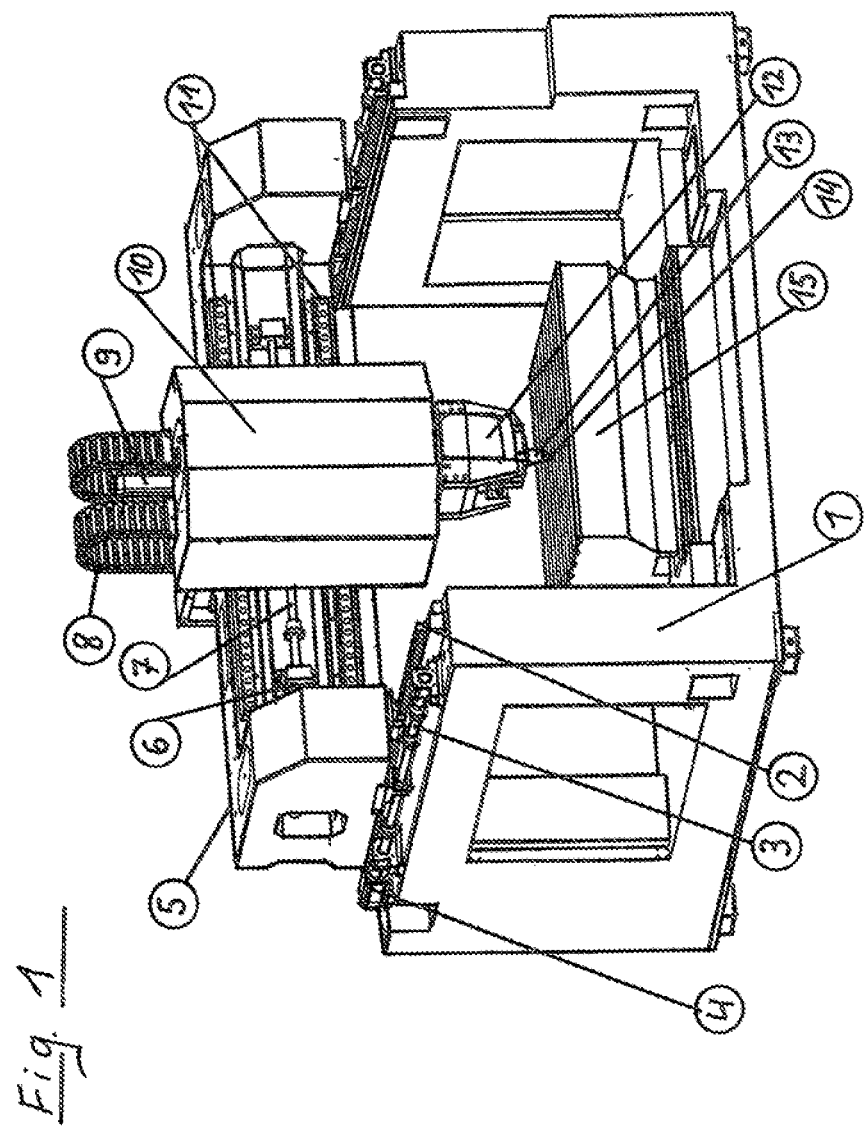

(58) Field of Classification Search
CPC .............. B23K 20/129; B23K 2103/08; B23K 20/122; B23K 20/1235; B23K 20/1265; B23K 2101/006; B23K 26/0876; B23K 37/0408
See application file for complete search history.

(56) References Cited

U.S. PATENT DOCUMENTS

| | | | |
|---|---|---|---|
| 9,296,071 B2* | 3/2016 | Krell | B23K 37/0211 |
| 10,477,697 B2* | 11/2019 | Seyama | H05K 13/0413 |
| 2002/0179673 A1* | 12/2002 | Strombeck | B23K 20/1205 228/1.1 |
| 2003/0209586 A1 | 11/2003 | Thompson | |
| 2005/0139639 A1* | 6/2005 | Larsson | B23K 20/123 228/112.1 |
| 2010/0199742 A1 | 8/2010 | Johnson et al. | |

FOREIGN PATENT DOCUMENTS

| | | |
|---|---|---|
| CN | 105598575 | 5/2016 |
| CN | 105834576 | 8/2016 |
| DE | 202014003072 | 4/2014 |
| DE | 202015000949 | 2/2015 |
| DE | 102014004331 | 6/2015 |
| JP | 2007313520 | 12/2007 |

\* cited by examiner

Fig. 5
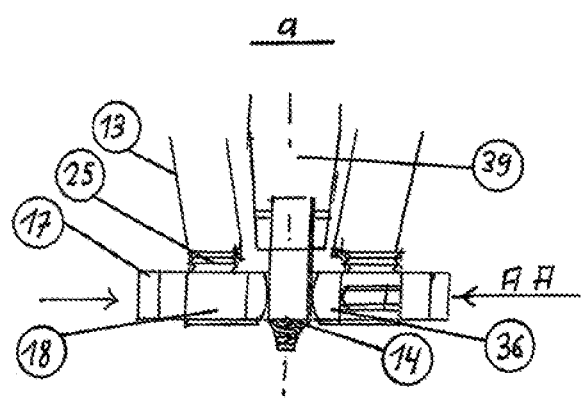
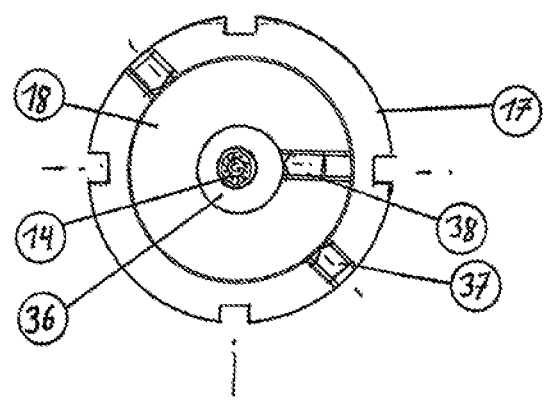

DEVICE AND METHOD FOR CHANGING THE WELDING DIRECTION OF THE WELDING SHOULDER OF A SYSTEM FOR A FRICTION STIR WELDING PROCESS VIRTUALLY WITHOUT DELAY

CROSS-REFERENCE TO RELATED APPLICATIONS

This application is a § 371 national stage entry of International Application No. PCT/DE2018/000334, filed on Nov. 14, 2018, which claims priority to German Patent Application No. 10 2017 010 965.6, filed on Nov. 27, 2017, the entire contents of which are incorporated herein by reference.

The application concerns a device and a method for changing the welding direction of the welding shoulder of a system for friction stir welding virtually without delay when required by the geometrical arrangement of the parts to be joined by welding or unevennesses of the material.

It is known that friction stir welding (FSW) is increasingly being used in aerospace engineering, rail transport technology and in automobile construction. This simple, clean and innovative joining method is distinguished by a high potential for automation and also elimination of the need for rivets, whereby the production costs are lowered and the weight of structures produced thereby is reduced.

Cited as prior art is the document DE 10 2014 004 331 B3, which originates from the applicant. This document concerns a method and a device for increasing the quality of the weld in friction stir welding and also a computer program and a machine-readable carrier with a program code for carrying out the method.

This document is based on the object of optimizing the welding operation in friction stir welding in such a way as to achieve complete avoidance of the so-called end hole (the negative impression of the stirring tool left at the end of welds) and consequently increase the quality of the weld.

To achieve this object, a device for increasing the quality of the weld in friction stir welding with the following features is claimed in patent claim 1:
  a) a receiving plate (1) with a driving head (2), wherein the latter has a receiving flange (19) for receiving a holding hell (3), which is connected by means of a union nut (7) to a welding shoe (4) with a welding pin tip (5),
  b) the welding shoe (4) has a circular base form, on which there is running over the cross section and raised at right angles to this base form a transverse web, which has approximately the width of ¼ to ⅕ of the diameter of the base form and has an arcuate shoe sliding surface and shoe smoothing surface (9), wherein a small planar area in the form of a notch-like taper (16) is located on each side of this area (9) in the region of the periphery of this area (9),
  c) the welding pin tip (5) has substantially a surface structure in the form of a pointed thread, this thread-like structure not being arranged purely circularly, but having three circumferentially distributed flats in each thread, wherein the centers of these flats respectively form an angle of 120 degrees to one another and the pitch of this thread-like structure is 0.5 mm and the flank height varies from 0.25 mm to 0.05 mm.

In many welding processes, it is necessary to change quickly and precisely the angle of contact of the welding shoe, or the welding shoulder, guiding the welding pin, in a way corresponding to the requirements that are imposed by the respective parts to be joined during the welding operation. Since, for this purpose, the entire machine that moves and controls the process of the friction stir welding must follow the necessary changes with its entire mass, the present invention is based on the object of relocating the local displacement of the shoulder angle of contact necessary for the FSW process from the machine to the welding head or the friction tool.

This object is achieved by the features in patent claim 1
a device for changing the welding direction of the welding shoulder of a system for friction stir welding virtually without delay when required by the geometrical arrangement of the parts to be joined by welding or unevennesses of the material, with the following features:
  a) a main body (1) with a welding table (15) and a bridge support (5) for the suspension (10) of a friction welding head (12), wherein the friction welding head (12) can steplessly move horizontally and vertically over the entire area of the welding table (15),
  b) a pin mount (13) for securing and driving a welding pin tip (14) of the friction welding head (12), wherein the welding pin tip (14) is guided within a welding shoulder (18) which can be cardanically moved by a multiply mounted and controlled welding shoulder mount (17),
  c) the welding shoulder mount (17) is controlled at multiple points, lying at an angle with respect to one another, by in each case a main adjusting drive (21), respectively articulated on the friction welding head (12), by means of in each case a push and pull rod (16) against the pressure of a centrally acting spring package (25).
  It is also claimed that, on at least one of the push and pull rods (16), the main adjusting drive is provided with a piezo fine regulating device (22), wherein the respectively acting force is monitored by means of a pressure measuring sensor (23) and that the spring package (25) consists of a combination of spring elements and controlled piezo elements and that the weld produced is observed by at least one camera (26) with means for pattern recognition and that means for measuring the angle of adjustment (31) of the welding shoulder (18) are provided, and that the welding shoulder (18) is heatable and that the input and output of weld metal is possible by means of gap-shaped arrangements in the region of the welding pin tip (14) during the welding operation.

And also the method for changing the welding direction of the welding shoulder of a system for friction stir welding virtually without delay when required by the geometrical arrangement of the parts to be joined by welding or unevennesses of the material, with the following method features:
  a) a main body (1) with a horizontally movable bridge support (5) has a friction welding head (12), vertically adjustable with it, which bears a pin mount (13) for securing and driving a welding pin tip (14), wherein a welding shoulder (18) has a multiply mounted welding shoulder mount (17),
  b) the welding shoulder mount (17) can be adjusted to any angles of contact in relation to the parts to be joined during the welding operation by means of various push and pull rods (16).
  It is also claimed in the method that the push and pull rods (16) have piezo fine regulating devices (22) and a computer program with a program code for carrying out the method steps when the program is run in a computer and also a machine-readable carrier with the program code of a computer program for carrying out the method when the program is run in a computer.

Figure 2:
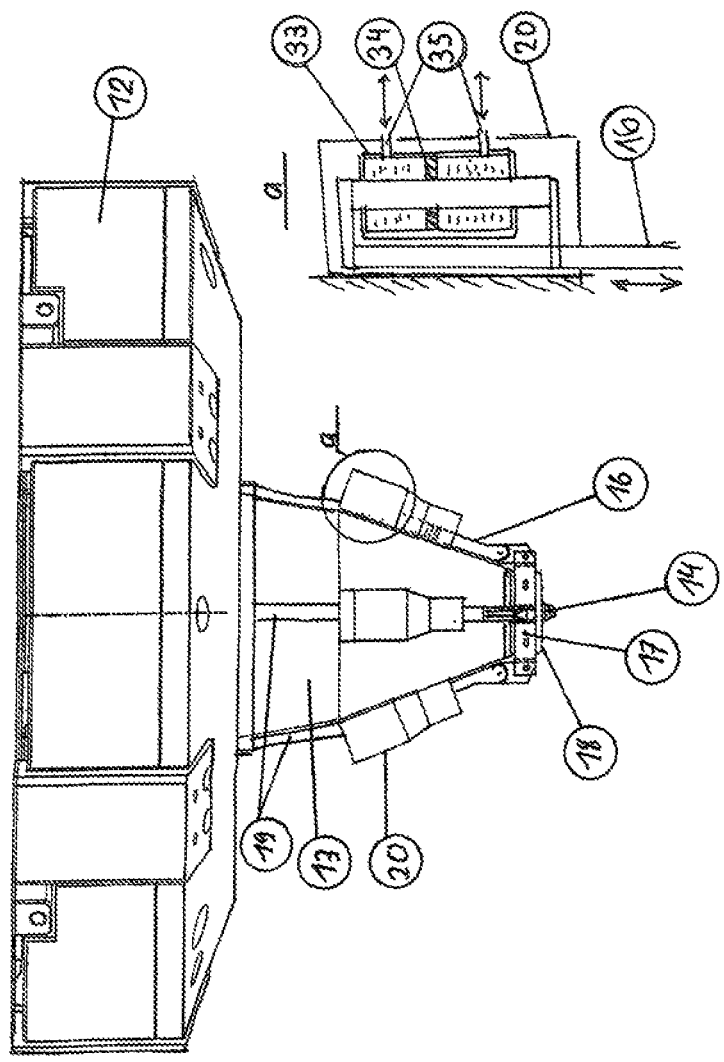
Figure 3:
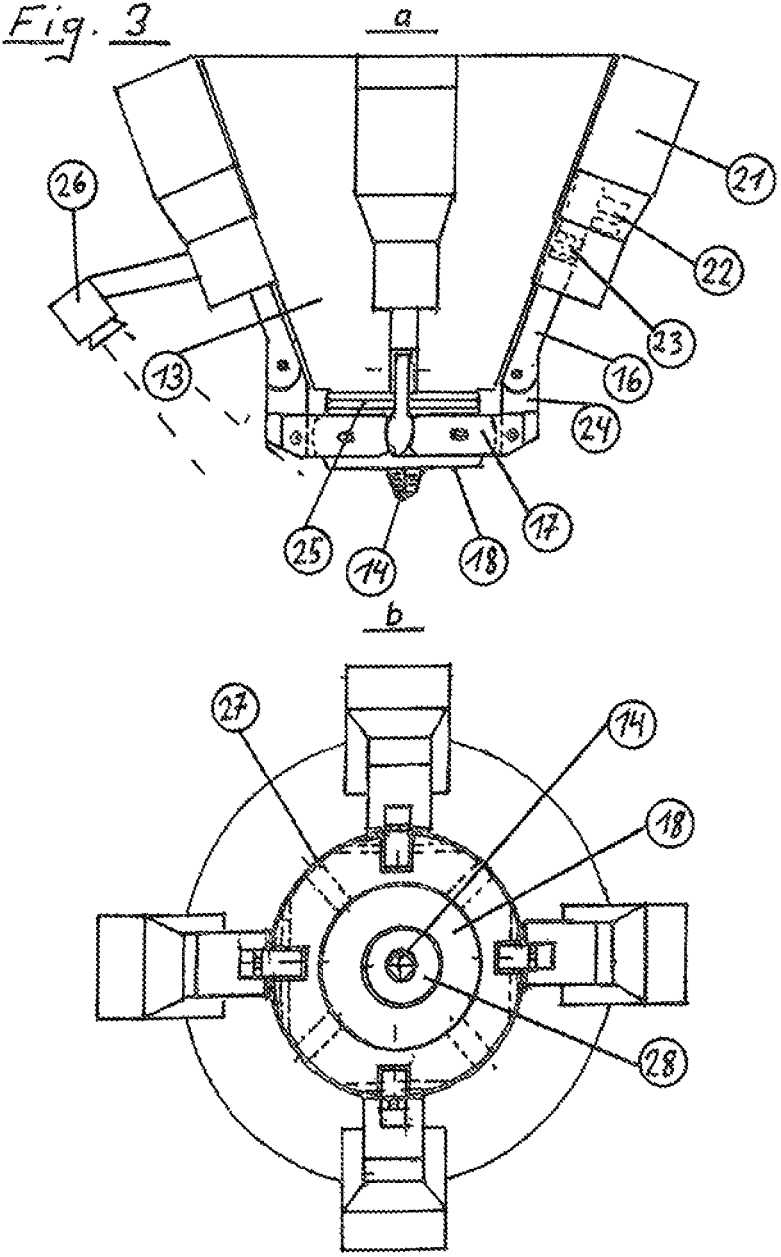
Figure 4:
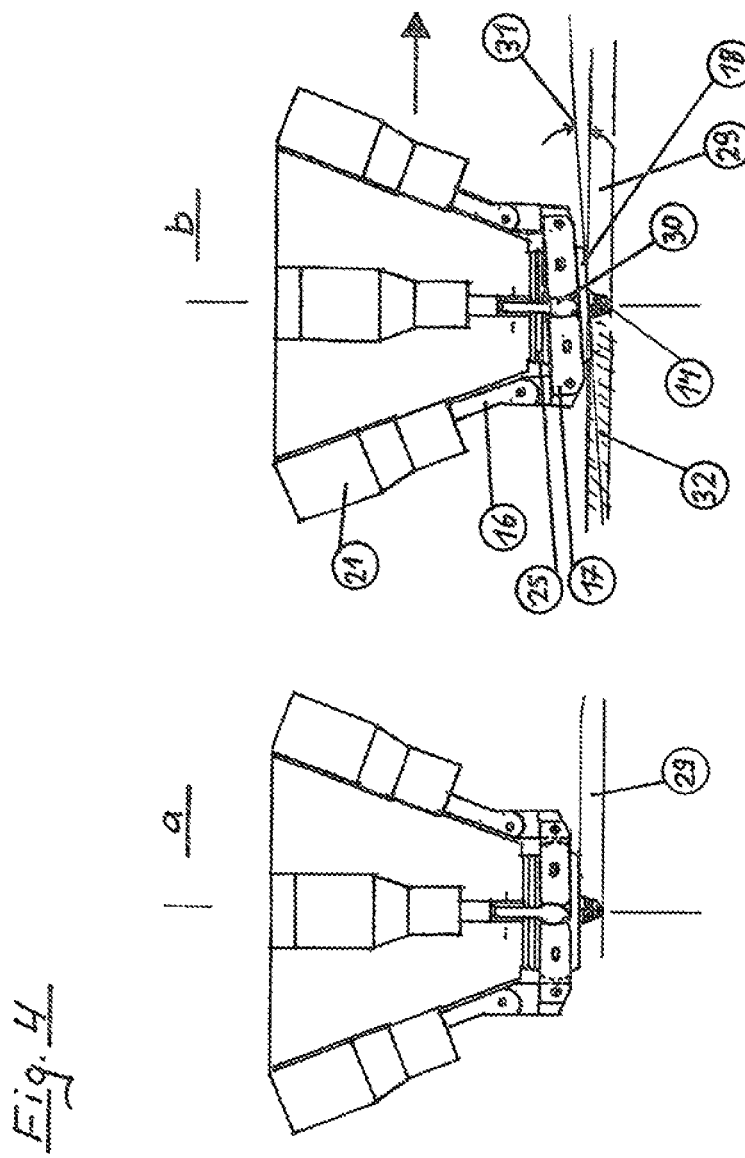

The invention is described in more detail below. Specifically:

FIG. 1 shows a perspective overall view of the device according to the invention FIG. 2 shows a perspective representation of the friction welding head according to the invention FIG. 3 shows a side view and a plan view from below of the pin mount for securing the welding pin FIG. 4 shows a more detailed view of the pin mount for securing the welding pin FIG. 5 shows an adaptive sealing ring 36 in the region of the welding shoulder 17

FIG. 1 shows a perspective overall view of the device according to the invention.

The main body 1 of the gantry-type welding device according to the invention has on the upper side, for moving a bridge support 5 bearing the suspension 10 of a friction welding head 12, a longitudinal guiding rail 2 on each of both sides of the bridge support 5. Parallel to the respective longitudinal guiding rail 2, the suspension 10 is moved by a drive 4, in each case by means of a driving and adjusting spindle 3 for the longitudinal adjustment of the bridge support 5. Serving for the transverse movement of the suspension 10 of the friction welding head 12 is the drive 6, which implements this movement over the rails 11 shown by means of a driving and adjusting spindle 7. Supply and control lines 8 for the operation of the gantry-type welding device lead into the suspension 10 and the vertical adjusting device 9 thereof. The suspension 10 bears a pin mount 13 for securing a welding pin with a welding pin tip 14. A welding table 15 serves for supporting and/or fastening the parts to be joined by welding.

FIG. 2 shows a perspective representation of the friction welding head according to the invention.

Underneath the friction welding head 12 is the pin mount 13 for securing and controlling the welding pin.

The welding shoulder 18, with the welding pin tip 14, is precisely controlled by a number of adjusting units 20, virtually without delay, by means of a disk-shaped plate, which serves as a welding shoulder mount 17 with a cardanic suspension. By contrast with the arrangement of a conventional cylinder bore for mounting the rotating friction pin, this welding shoulder mount 17 makes a pitching movement possible in every spatial direction. While in the simplest construction stage of the welding shoulder mount 17 such a pitching movement is only possible in the direction of the feed, that is to say to a certain extent a dragging contact angle is established during the welding operation, FIG. 2 shows a further construction stage. In this further construction stage of the welding shoulder mount 17, the holder of the disk-shaped shoulder can be inclined in every spatial direction, that is to say can to a certain extent perform a tumbling movement. The corresponding force transmission to the welding shoulder 18 takes place by means of four push and pull rods 16, arranged at an angle of 90 degrees to one another. More details can be taken from FIG. 3. This form of construction is only given by way of example. Thus, the interaction of the push and pull rods 16 shown can be supplemented by means of further push and pull rods 16, arranged symmetrically in a circle. However, the mounting of the disk-shaped shoulder is not necessarily rotationally symmetrical, since every welded connection imposes different requirements on the mobility of the pitching movements of the rotating friction pin. Altogether, the disk shape according to the invention of the welding shoulder mount 17 makes lower friction and smoother surfaces of the weld possible. Each adjusting unit 20 has supply and control lines 19.

FIG. 2a shows a representation of a detail of an adjusting unit 20.

Arranged here in the region of a push and pull rod 16, in each case for moving such a push and pull rod 16, is a double-acting piston 34, which is movable in two opposed directions and is actuated by means of two, correspondingly activatable, control lines 35 in a hydraulic cylinder 33. This arrangement is only given by way of example. Electrical drives of any type may also be used of course. As a further special form of construction, a separate heater is provided for heating the welding shoulder.

FIG. 3 shows a side view and a plan view from below of the pin mount for securing the welding pin.

In FIG. 3a, a side view of the pin mount 13 for securing the welding pin can be seen. The respective main adjusting drive 21 for the push-rod movement of a push and pull rod 16 may be performed by means of a hydraulic device. The fine regulation of the movement of a push rod 16 is controlled by means of a piezo device 22, wherein a pressure measuring sensor 23 serves for registering the forces occurring. The welding shoulder mount 17, moved by the four push and pull rods 16 on four sides by means of an articulated lever 24 in each case, is pressed centrally against the welding shoulder 18 by means of a spring package 25 mounted centrally around the welding pin tip 14. The interaction of the compressive force applied on the one hand by the spring package 25 and the various counter forces applied by the four push and pull rods 16 results in the cardanic suspension of the disk-shaped plate of the welding shoulder mount 17.

A camera 26, represented to the side of the pin mount 13, stands symbolically for a system of observation elements (not designated any more specifically) of a finished weld.

In FIG. 3b, the welding pin tip 14 can be seen centrally, in the middle of the welding shoulder 18 with the welding pin 28, wherein the welding shoulder 18 is fastened by means of the grub screws 27 shown. Alternatively, a permanent connection such as soldering or shrink-fitting is possible here.

FIG. 4 shows a more detailed view of the use of the pin mount for securing the welding pin.

In FIG. 4a, the securement during the welding operation with an indicated part to be joined 29 is shown.

In FIG. 4b, the pin mount 13 is represented in use during a welding operation with a slightly tilted welding shoulder mount 17 with the welding shoulder 18. Shown on the left side here is a main adjusting drive 21 with its associated push and lift rod 16 in an extended position, which results in a slight inclination of the welding shoulder mount 17 under the counter pressing effect of the spring package 25. The resultant angle of inclination or angle of adjustment 31 of the welding shoulder to the surface of the parts to be joined may in this case be a maximum of 2 to 5 degrees. Generally, an angle of adjustment 31 of up to 3 degrees should be sufficient. The designated articulated lever head 30 of the articulated lever visible here can be seen in this view from the front. The welding pin tip 14 represented leads from the finished weld 32 into the region of the part to be joined 29 according to the thick reference arrow pointing to the right.

Means known to a person skilled in the art are provided for measuring the angle of adjustment 31 of the welding shoe shoulder.

FIG. 5 shows an adaptive sealing ring 36 in the region of the welding shoulder mount 17.

In FIG. 5a, this sealing ring 36 with its rounded flanks, serving for the mobility of the welding pin tip 14, can be seen in the middle of the welding shoulder 18. The welding shoulder mount 17 and the spring package 25 in the region of the pin mount 13 enclose the tool shank 39 for holding the welding pin tip 14.

In FIG. 5b, the cross section shown in the direction of the section A-A in FIG. 5a is represented. The welding shoulder 18 is fastened on the mount 17 by in each case one of the oppositely lying clamping screws 37, while the adaptive sealing ring 36 is fastened by a clamping screw 38. Alternatively, a permanent connection such as soldering or shrink fitting is possible here.

To increase the maximum achievable feed rate during the friction stir welding, preferably hard metal shoulders with a high thermal conductance are used. Preferably, tungsten carbide/cobalt hard metals are used. The integration of a heater in the welding shoulder allows temperature adjustment appropriate for the active location to be achieved, so that even under dynamic process control the friction pin does not encounter cold material, which would cause excessive shearing and consequently premature pin failure. By installing the shoulder heater between the actual shoulder and the associated support, it is independent of the wearing component of the tool, with no change or conversion being required.

It may be provided as a special form of construction that the input and output of weld metal is possible by means of gap-shaped arrangements in the region of the welding pin tip (14) during the welding operation.

LIST OF DESIGNATIONS

1 Main body of the gantry-type welding device
2 Longitudinal guiding rail
3 Driving and adjusting spindle for the longitudinal adjustment
4 Drive of the longitudinal adjustment
5 Bridge support of the gantry-type welding device
6 Drive for the transverse movement of the suspension 10
7 Driving and adjusting spindle for the transverse movement
8 Supply and control lines for operation
9 Vertical adjusting device for the friction welding head
10 Suspension of the friction welding head
11 Rails for the transverse guidance of the gantry-type welding device
12 Friction welding head
13 Pin mount for securing the welding pin
14 Welding pin tip
15 Welding table
16 Push and pull rod of the adjusting unit 20
17 Welding shoulder mount (disk-shaped plate with cardanic suspension)
18 Welding shoulder (stationary shoulder)
19 Supply and control line of the adjusting unit 20
20 Adjusting unit for adjusting the welding shoulder mount disk 17
21 Main adjusting drive (for example hydraulic) for the push-rod movement of a push and pull rod 16
22 Piezo fine regulating device of a push rod 16
23 Pressure measuring sensor
24 Articulated lever
25 Spring package for building up the stress on the mounting disk 17 (for example cup springs)
26 Camera for pattern recognition for monitoring the weld
27 Grub screw for fastening the welding shoe
28 Welding pin
29 Part to be joined
30 Articulated lever head
31 Angle of adjustment of the welding shoe to the surface of the part to be joined (max 5 degrees)
32 Weld
33 Hydraulic cylinder
34 Double-acting piston
35 Control line
36 Adaptive sealing ring
37 Clamping screw for fastening the shoulder
38 Clamping screw for fastening the sealing ring 36
39 Tool shank for holding the welding pin tip 14

The invention claimed is:

1. A device for changing the welding direction of the welding shoulder of a system for friction stir welding when required by the geometrical arrangement of the parts to be joined by welding or unevennesses of the material, with the following features:
   a) a main body (1) with a welding table (15) and a bridge support (5) for the suspension (10) of a friction welding head (12), wherein the friction welding head (12) can steplessly move horizontally and vertically over the entire area of the welding table (15),
   b) a pin mount (13) for securing and driving a welding pin tip (14) of the friction welding head (12), wherein the welding pin tip (14) is guided within a welding shoulder (18) which can be cardanically moved by a welding shoulder mount (17),
   c) the welding shoulder mount (17) is controlled at multiple points, spaced apart from one another, by in each case a main adjusting drive (21), respectively articulated on the friction welding head (12), by means of in each case a push and pull rod (16) against the pressure of a spring package (25).

2. The device as claimed in claim 1, wherein, on at least one of the push and pull rods (16), the main adjusting drive is provided with a piezo fine regulating device (22), wherein a respectively acting force is monitored by means of a pressure measuring sensor (23).

3. The device as claimed in claim 1, wherein the spring package (25) comprises of a combination of spring elements and controlled piezo elements.

4. The device as claimed in claim 1, wherein the weld produced is observed by at least one camera (26) with means for pattern recognition.

5. The device as claimed in claim 1, wherein means for measuring a angle of adjustment (31) of the welding shoulder (18) are provided.

6. The device as claimed in claim 1, wherein the welding shoulder (18) is heatable.

7. A method for changing the welding direction of the welding shoulder of a system for friction stir welding when required by the geometrical arrangement of the parts to be joined by welding or unevennesses of the material, with the following method features:
   a) a main body (1) with a horizontally movable bridge support (5) has a friction welding head (12), vertically adjustable with it, which bears a pin mount (13) for securing and driving a welding pin tip (14), wherein a welding shoulder (18) can be cardanically moved by a welding shoulder mount (17),
   b) the welding shoulder mount (17) can be adjusted to any angles of contact in relation to the parts to be joined during the welding operation by means of various push and pull rods (16),
   wherein the method comprises:
      changing the welding direction of the welding should mount (17) during welding.

8. The device as claimed in claim 6, wherein the push and pull rods (16) have piezo fine regulating devices (22).

* * * * *